(12) United States Patent
Demuth

(10) Patent No.: US 6,299,304 B1
(45) Date of Patent: Oct. 9, 2001

(54) VISUAL AID FOR DIRECTING LIGHT ONTO AN OPTICALLY RESPONSIVE PORTION OF AN EYE

(76) Inventor: Ryan Demuth, 426 Thomas Dr., Dunmore, PA (US) 18512

( * ) Notice: Subject to any disclaimer, the term of this patent is extended or adjusted under 35 U.S.C. 154(b) by 0 days.

(21) Appl. No.: 09/638,753

(22) Filed: Aug. 14, 2000

(51) Int. Cl.[7] ................ G02B 1/00; G02B 7/16
(52) U.S. Cl. ................ 351/41; 351/45; 351/158
(58) Field of Search ................ 351/41, 50, 158, 351/45

(56) References Cited

U.S. PATENT DOCUMENTS

| | | |
|---|---|---|
| 1,991,107 | 2/1935 | Armbruster . |
| 3,423,151 | 1/1969 | White . |
| 4,155,633 | 5/1979 | Benavie . |
| 4,581,031 | 4/1986 | Koziol et al. . |
| 4,673,263 | 6/1987 | Onufryk . |
| 4,772,113 | 9/1988 | Parker . |
| 4,779,972 | 10/1988 | Gottlieb . |
| 4,958,924 | 9/1990 | Parker . |
| 5,155,508 | 10/1992 | Onufryk . |
| 5,173,720 | 12/1992 | Lee et al. . |
| 5,323,190 | 6/1994 | Onufryk . |

Primary Examiner—Hung Xuan Dang
(74) Attorney, Agent, or Firm—McNees, Wallace & Nurick; Mitchell A. Smolow; Carmen Santa Maria

(57) ABSTRACT

A visual aid for directing incident light rays received from an object source onto remaining optically responsive portions of an eye comprises a first light reflecting optical element resistively pivotally attached to a frame, such that the pivot axis is in a generally horizontal plane; and, a second light reflecting optical element resistively pivotally attached to the frame, such that the pivot axis is in a generally horizontal plane. The second light reflecting optical element is laterally spaced from the first light reflecting optical element such that the first and second light reflecting optical elements cooperate to direct the incident light onto the remaining optically responsive portions of the eye. In a different embodiment of the present invention, at least one corrective lens is positioned between the object source and the optically responsive portion of the eye. The present invention also includes the method of using two laterally spaced resistively pivotal light reflecting optical elements cooperating together to redirect incident light onto an optically responsive portion of an eye, as well as the visual aid produced by such method.

19 Claims, 2 Drawing Sheets

VISUAL AID FOR DIRECTING LIGHT ONTO AN OPTICALLY RESPONSIVE PORTION OF AN EYE

FIELD OF THE INVENTION

The present invention relates generally to sight corrective apparatus, and more particularly to glasses adapted to improving the vision of people suffering from macular degeneration.

BACKGROUND OF THE INVENTION

Macular degeneration is the leading cause of blindness in people over the age of 55 in the United States and affects more than 10 million Americans. It is caused by deterioration of the central portion of the retina. The retina contains a photosensitive array of cells lining the back of the eye. As light falls on these cells, it is transformed into electrical signals which are relayed to the vision centers of the brain.

The central portion of the retina is known as the macula. The macula is a small region of the retina and is responsible for focusing central vision in the eye. Degenerative changes in the macula such as caused by macular degeneration, accounts for the vast majority of sight threatening changes in the population over age 50.

Macular degeneration presents as two basic types: "dry" and "wet". Most cases of macular degeneration, approximately 85–90% of all cases, are the "dry" (atrophic) type. The deterioration of the retina in the "dry" type of macular degeneration occurs due to the formation of small yellow deposits known as drusen which form in the macula, resulting in a thinning and drying out of the macula. The amount of vision loss is directly related to the amount and location of the retinal thinning caused by the drusen. The progressive vision loss associated with the "dry" type of macular degeneration tends to progress much more slowly than the "wet" type, and there is no known treatment or cure for the "dry" type of macular degeneration.

The "wet" type of macular degeneration is due to the growth of abnormal blood vessels under the retina and macula, known as subretinal neovascularization. Leaking fluid or blood from these blood vessels cause the macula to bulge or lift up with resulting distortion or loss of central vision. Unlike the "dry" type, the "wet" type of macular degeneration may have rapid and severe vision loss. While the "wet" type of macular degeneration may be treated with laser therapy, these therapies are limited in effectiveness, and serve mainly to slow the rate of vision loss.

In the "dry" type of macular degeneration, as parts of the macula begin to die, blank spots appear in the central portion of vision. Additionally, the central vision may appear blurry and straight lines may look wavy. Peripheral or side vision is rarely affected. In the "wet" type of macular degeneration the macula is no longer smooth, as a result, straight lines may also look wavy, similar in appearance to the "dry" type. Due to blood or fluid under the macula, in the "wet" type, the patient may see a dark spot or spots in the center of their vision. As in the "dry" type of macular degeneration, peripheral or side vision is rarely affected.

Attempts have been made to increase the quality of life of patients suffering from macular degeneration by refocusing light rays onto healthy peripheral portions of the eye, for example, by utilizing prismatic lenses. U.S. Pat. Nos. 5,155, 508 and 5,323,190 to Onufryk; U.S. Pat. Nos. 4,772,113 and 4,958,924 to Parker, and U.S. Pat. No. 4,779,972 to Gottlieb all disclose prismatic lenses to redirect light. These prismatic lenses are technically difficult and expensive to manufacture, and once made, they focus light rays to only a pre-selected peripheral portion of the eye. As degenerative changes continue, redirecting light rays to the remaining healthy portions of the eye requires manufacture of new prismatic lenses at considerable additional expense.

U.S. Pat. No. 4,673,263 to Onufryk relates to utilizing paired angle mirrors as part of diagnostic machinery to determine which peripheral areas of the eye remain healthy. An optical image deflecting assembly is provided having a fixed light reflecting optical element, such as a mirror, and a pivotal reflecting optimal element, such as a mirror. Light received from one of the mirrors is reflected onto a peripheral area of an eye for scanning an arcuate portion of the area upon pivotal movement of the pivotal mirror. The pivotal optical element is pivoted at incremental positions for scanning an annular peripheral area of each eye and locating the most visually sensitive areas.

Other diseases resulting in visual loss have also been treated utilizing mirrors, for example, homonymous hemianopsa A patient suffering homonymous hemianopsa loses sight on the same side of the normal visual field of both eyes, producing only half a field of vision from each eye. U.S. Pat. No. 4,155,633 to Benavie discloses two spaced reflectors whose pivot axis is disposed in a generally vertical plane. The reflectors are positioned in front of only one of the two affected eyes in a manner such that one or both of the reflectors block the direct field of view seen by only one of the eyes, i.e., the field that would be seen by one of the eyes in the absence of the corrective device, and substitute a virtual image of an additional horizontal angle sight which is outside the uncorrected limited visual field of view.

Although the existing art discloses the use of paired angled reflecting mirrors to reflect an image onto a peripheral area of an eye, these mirrors are used for diagnostic purposes and not in conjunction with eyeglass wear. One mirror is fixed and the other is rotatable, thus limiting the ability to redirect light rays.

What is needed is a simple, affordable device to redirect light rays to the healthy peripheral portion of an eye in patients suffering from macular degeneration, adjustable as vision continues to deteriorate without the need for costly replacement of the entire unit.

SUMMARY OF THE INVENTION

In accordance with an aspect of the present invention, a visual aid for directing incident light rays received from an object source onto remaining optically responsive portions of an eye comprises a first light reflecting optical element resistively pivotally attached to a frame, such that the pivot axis is in a generally horizontal plane; and, a second light reflecting optical element resistively pivotally attached to the frame, such that the pivot axis is in a generally horizontal plane.

The second light reflecting optical element is laterally spaced from the first light reflecting optical element such that the first and second light reflecting optical elements cooperate to direct the incident light onto the remaining optically responsive portions of the eye.

In a different embodiment of the present invention, at least one corrective lens is positioned between the object source and the optically responsive portion of the eye.

The present invention also includes the method of using two laterally spaced resistively pivotal light reflecting optical elements cooperating together to redirect incident light onto an optically responsive portion of an eye, as well as the visual aid produced by such method.

One advantage of the present invention is the ability to direct light rays onto an optically responsive portion of an eye in a more cost-effective manner than by machining complex prismatic lenses.

Another advantage of the present invention is the ability to continually adjust both cooperating resistively pivotal light reflecting optical elements. As the ocular disease progresses, causing a reduction in the remaining optically responsive portions of the eye, either or both cooperating light reflecting elements may be adjusted to direct incident light rays onto remaining optically responsive portions of an eye, thereby avoiding the need and expense of purchasing new lenses. While paired reflecting surfaces are known in the art, the unexpected economical benefits of having both horizontal reflecting surfaces adjustable have been heretofore undiscovered.

Other features and advantages of the present invention will be apparent from the following more detailed description of the preferred embodiment, taken in conjunction with the accompanying figures which illustrate, by way of example, the principles of the invention.

DETAILED DESCRIPTION OF THE PREFERRED EMBODIMENTS

Figure 1:
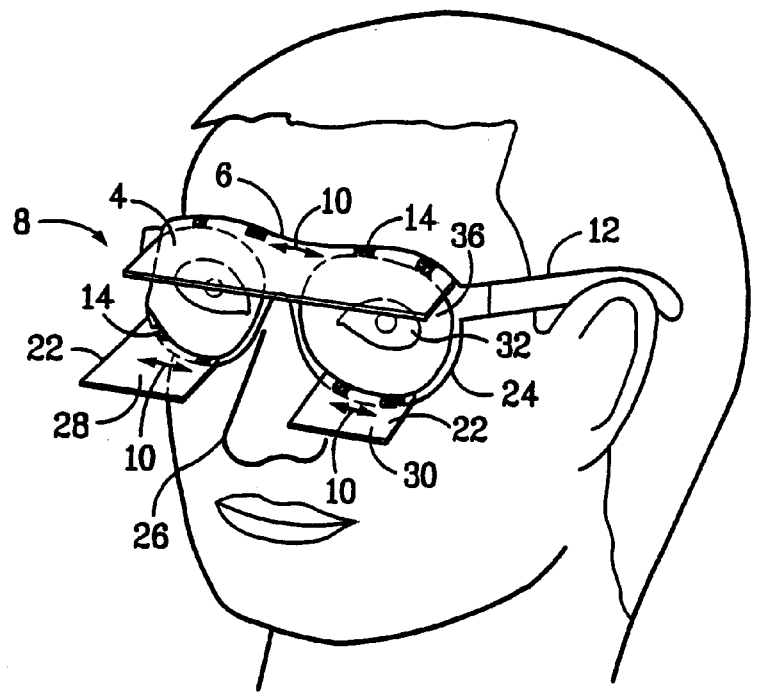
FIG. 1 is a representation of a frontal view of one form of the present invention.

Referring now to the Figures, where like parts have the same numbers, in accordance with a preferred embodiment of the invention, FIG. 1 shows a first light reflecting optical element 4 resistively pivotally attached to the top rim 6 of a standard eyeglass frame 8, such that the pivot axis 10 is in a generally horizontal plane. The frame 8 may be manufactured from any lightweight, sturdy material, for example, plastic, titanium, stainless steel, plastic covered metal, and the like. The frame 8 is held in place by ear pieces 12. Optionally, the ear pieces may be omitted, and the frame 8 clipped to a standard eyeglass frame (not shown).

Figure 2:
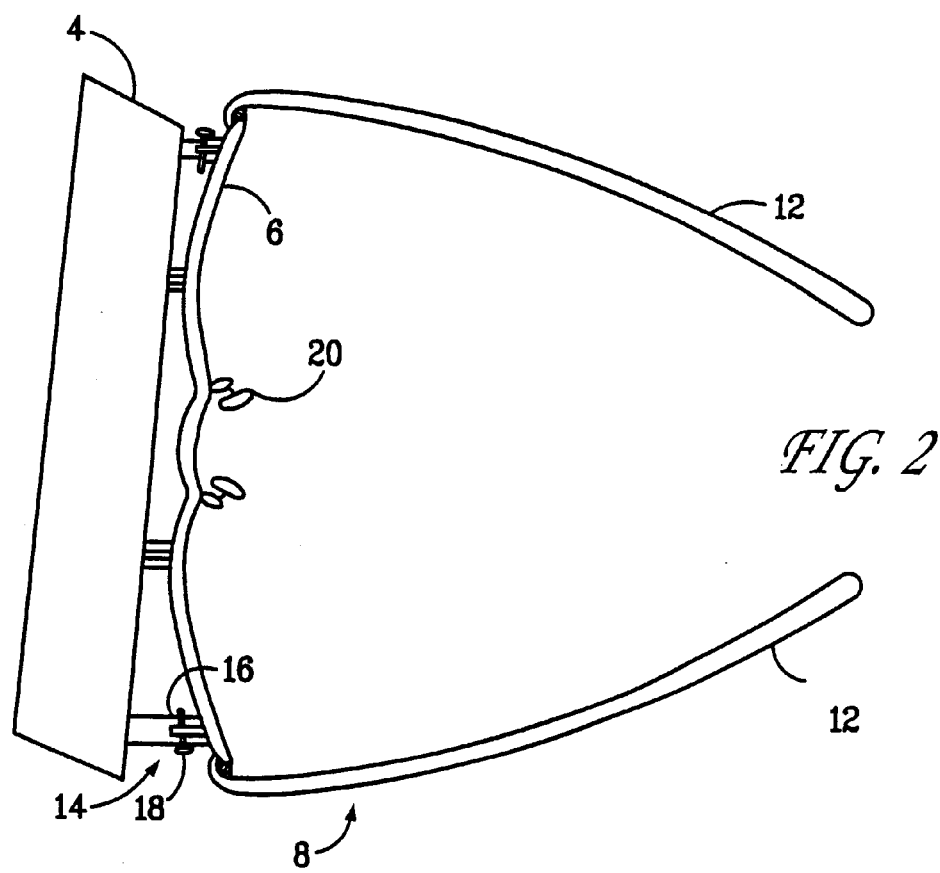
FIG. 2 is a representation of a top view of one form of the present invention.

As shown in FIG. 2, the resistive pivotal attachment 14 may be for example, a hinge 16 with a fastener 18 substituted for a hinge pin, for example a screw or a bolt and nut. Once the hinge 16 is pivoted to a pre-selected position, the fastener 18 is tightened, thereby holding the hinge 16 in the pre-selected position. Alternatively, the hinge 16 may be a ratchet, such that a predetermined force load will allow the hinge 16 to pivot, yet a lesser force load will not, or the hinge 16 halves may be mated in a manner such that they are held in position by friction, but movable upon application of a predetermined force load.

Figure 3:
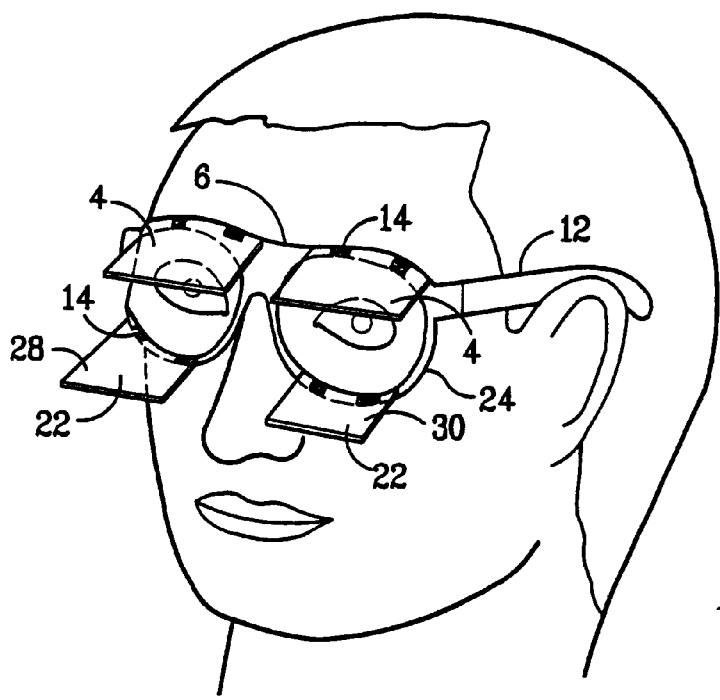
FIG. 3 is a representation of a front view of an alternate form of the present invention.

Returning to FIG. 1, the first light reflecting optical element 4 may be for example, a mirrored polycarbonate, for example mirrored Plexiglas or mirrored Lexan; mirrored glass; or a highly polished metal surface. Mirrored polycarbonates offer the advantage of reduced weight. The mirrored surface may be a front surface reflecting mirror or a rear surface reflecting mirror. In length, the first light reflecting optical element approximates the distance from ear piece 12 to ear piece 12 of the eyeglass frame 8, and is, for example, about 4¾ inches in width and about 1½ inches in depth, although these dimensions are not critical. The dimensions may be varied, although it should be appreciated the greater the surface area, the more incident light will be redirected. However, increased surface area also means increased weight, so a balance comfortable to the patient must be achieved. The corners of the optical elements optionally are rounded so as not to be sharp. The first light reflecting optical element is pivotally attached by at least two, preferably four resistive pivotal attachments 14 to the top rim 6, preferably by at least one attachment point on either side of the nosepiece 20. At least one resistive pivotal attachment 14 is resistively pivotal as described above, in order to position the first light reflecting optical element 4 at a pre-selected position. Optionally, as shown in FIG. 3, the first light reflecting optical element 4 may consist of two separate halves. However, it is preferable that the first light reflecting optical element 4 be a single piece in order to minimize distortion.

At least one second light reflecting optical element 22 is resistively pivotally attached to the lower rim 24 of the eyeglass frame 8 such that the pivot axis 10 is in a generally horizontal plane, in like manner as the first reflecting optical element 4 is pivotally attached to the top rim 6, i.e. utilizing at least one resistive pivotal attachment 14. The presence of the nose 26 requires separate right 28 and left 30 second light reflecting optical elements 22, one for each lower rim 24 if the disease has affected both eyes. Preferably, each second light reflecting optical element 22 is attached to a lower rim 24 by at least two attachment points, with at least one attachment point resistively pivotal as described above. Each second light reflecting optical element 22 is, for example, about 2 inches in width and about 1½ inches in depth. The width is determined by the lower rim 24 size, however, as with the first light reflecting optical element 4, the dimensions may be varied, although the greater the surface area, the more incident light will be redirected. Increased surface area means increased weight, so that a balance comfortable to the patient must be achieved. It should be appreciated that if only one eye 32 suffers from loss of vision, only the affected eye 32 requires a second light reflecting optical element 22. In the event only one eye 32 is affected, optionally, the first light reflecting optical element 4 may be reduced in length to span the width of only the affected eye 32.

Figure 4:
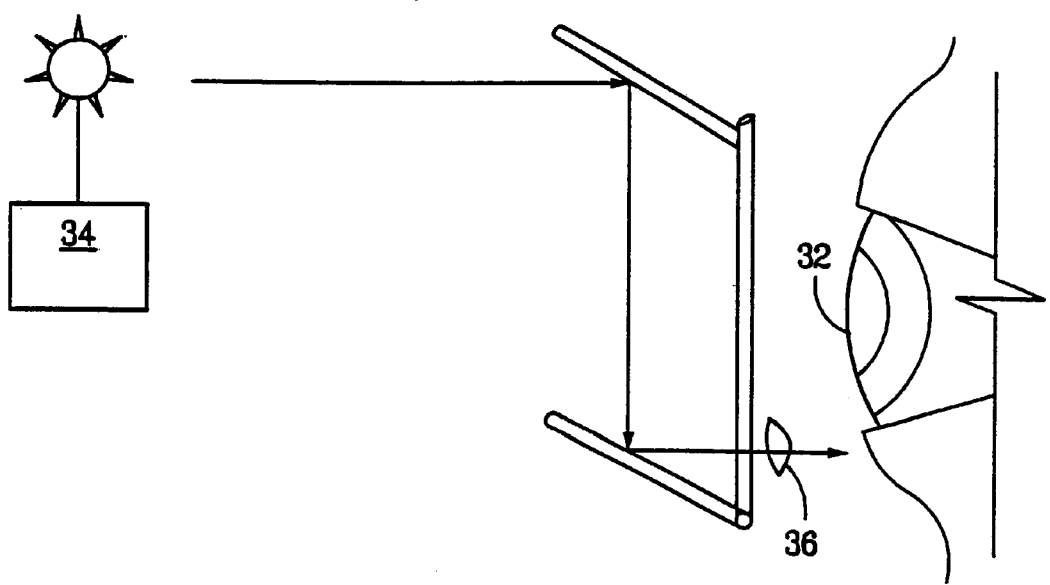
FIG. 4 is a representation of the travel path of an incident light ray.

As depicted in FIG. 4, the first and second light reflecting optical elements 4, 22 are spaced from one another and cooperate to direct incident light from an object source 34 onto an optically responsive portion of the eye 32. The first and second light reflecting optical elements 4, 22 are positioned to allow at least a portion of the incident light from a direct field of view to strike an optically responsive portion of the eye 32.

The eyeglass frame 8 may optionally hold, in standard fashion, corrective lenses 36. If no refractive correction is required, the eyeglass frame may contain a non-refractive glass or plastic lens, or no lens at all. Alternatively, a corrective lens 36 may be adhered with an appropriate adhesive directly to either the first 4 or second 22 light reflecting optical element, or to both. The critical factor is that the corrective lens 36 be positioned between the object source and the optically responsive portion of the eye 32.

In use, the present invention operates as follows: The hinge fasteners 18 are loosened to allow all light reflecting optical elements 4, 22 to resistively pivot such that they temporarily hold their position upon placement. The eyeglass frame 8 is positioned on the patient's head with the first 4 and second 22 light reflecting optical elements all placed in an initial starting position of about 90 degrees angulation relative to the vertical plane. The right 28 and left 30 second light reflecting optical elements are then pivotally adjusted relative to one another until only one object source 34 is seen when looking downward with both eyes 32 into each eye's 32 respective second reflecting optical element 22.

The first light reflecting optical element 4 and the second light reflecting optical elements 22 are then pivotally adjusted relative to one another so as to provide the desired view forward as they cooperates with each other. The angulation of the light reflecting optical elements 4, 22 will vary as necessary to direct light onto remaining optically sensitive areas of the eye. Once the desired forward view is obtained, all hinge fasteners 18 are tightened so as to prevent further pivotal movement of the light reflecting optical elements 4, 22.

In this manner, through cooperation of the reflecting optical elements 4, 22, by looking downward into the second reflecting optical elements 22 and using the portion of the eye 32 still retaining optical sensitivity, the patient is able to receive a forward view not otherwise achievable.

As discussed previously, the first 4 and second 22 light reflecting optical elements may be resistively pivotally mounted to a first eyeglass frame 8 without ear pieces 12. Using, for example, clips, the first eyeglass frame 8 may be mounted onto a second eyeglass frame (not shown) containing corrective lenses 36 and ear pieces 12. In this manner, the visual aid of the present invention may be easily transferred from one set of corrective lenses 36 to another, such as for example, from clear corrective lenses for indoor use to corrective sunglasses for outdoor use, or from corrective lenses for reading to corrective lenses for distant vision.

Although the present invention has been described in connection with specific examples and embodiments, those skilled in the art will recognize that the present invention is capable of other variations and modifications within its scope. For example, while the visual aid of the present invention has been described for use with macular degeneration, it is expected to be effective in other diseases of the eye displaying clinical manifestations of visual loss with remaining optically responsive areas, for example, tunnel vision.

Additionally, while in the preferred embodiment the first and second light reflecting optical elements are positioned to cooperate such that the object source is viewed by looking downward into the second light reflecting optical elements, the elements may also be positioned to cooperate such that the object source is viewed by looking up into the first light reflecting optical element. These examples and embodiments are intended as typical of, rather than in any way limiting on, the scope of the present invention as presented in the appended claims.

What is claimed is:

1. A visual aid for directing incident light rays received from an object source onto an optically responsive portion of an eye comprising:
    a first light reflecting optical element resistively pivotally attached to a frame, wherein the pivot axis is in a generally horizontal plane; and,
    a second light reflecting optical element resistively pivotally attached to the frame, wherein the pivot axis is in a generally horizontal plane,
    wherein the second light reflecting optical element is spaced from the first light reflecting optical element such that the first and second light reflecting optical elements cooperate to direct the incident light rays onto the optically responsive portion of the eye, the first and second light reflecting optical elements further positioned to allow at least a portion of the incident light from a direct field of view to strike the optically responsive portion of the eye.

2. The visual aid of claim 1 wherein the light reflecting optical elements are selected from the group consisting of front surface reflecting mirrors, rear surface reflecting mirrors, highly polished metal and combinations thereof.

3. The visual aid of claim 2 wherein the light reflecting optical elements are a mirrored polycarbonate.

4. The visual aid of claim 1 wherein the light reflecting optical elements are resistively pivotally attached by a hinge.

5. The visual aid of claim 4 wherein the hinge is movable only upon application of a predetermined force load.

6. The visual aid of claim 4 wherein the hinge further includes a fastener pivot pin.

7. The visual aid of claim 6 wherein the fastener pivot pin is selected from the group consisting of a screw and a nut and bolt.

8. The visual aid of claim 1 wherein the light reflecting optical elements are resistively pivotally attached by a ratchet.

9. The visual aid of claim 1 wherein the length and width of the light reflecting optical elements are an effective length and width to redirect an effective amount of incident light while maintaining an effective comfortable weight.

10. The visual aid of claim 1 wherein the first light reflecting optical element is about the width of the frame in width and about 1½ inches in depth; and a right and a left second light reflecting optical element are each about the width of a right and a left lower rim, respectively, in width and about 1½ inches in depth.

11. The visual aid of claim 1 further comprising a corrective lens positioned between the object source and the optically responsive portion of the eye.

12. The visual aid of claim 11 wherein the corrective lens is fixed to the frame.

13. The visual aid of claim 11 wherein the corrective lens is fixed to at least one light reflecting optical element.

14. A method for redirecting light onto an optically responsive portion of an eye comprising the steps of:
    positioning on a frame a first resistively pivotal light reflecting optical element and a second resistively pivotal light reflecting optical element, both elements having their pivot axis in a generally horizontal plane, wherein the first and second resistively pivotal light reflecting optical elements are spaced from one another; and
    pivotally adjusting the first and second light reflecting optical elements to cooperate with one another such that incident light rays from an object source are redirected onto the optically responsive portion of the eye, the first and second resistively pivotal light reflecting optical elements further positioned to allow at least a portion of the incident light from a direct field of view to strike the optically responsive portion of the eye.

15. The method of claim 14 further comprising the step of placing a corrective lens between the object source and the optically responsive portion of the eye.

16. The method of claim 14 wherein the corrective lens is placed within an eyeglass frame.

17. The method of claim 14 wherein the corrective lens is mounted on at least one light reflecting optical element.

18. The method of claim 14 further comprising attaching the frame to a second frame positioned between the first frame and the eye.

19. The visual aid produced by the method of claim 14.

* * * * *